(12) United States Patent
Otey et al.

(10) Patent No.: US 8,595,240 B1
(45) Date of Patent: Nov. 26, 2013

(54) LABELING OBJECTS BY PROPAGATING SCORES IN A GRAPH

(75) Inventors: Matthew Eric Otey, Pittsburgh, PA (US); Amit Prakash, Homestead, PA (US); Jonathan Michael Scott, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 408 days.

(21) Appl. No.: 12/889,883

(22) Filed: Sep. 24, 2010

(51) Int. Cl.
*G06F 7/00* (2006.01)
*G06F 17/30* (2006.01)

(52) U.S. Cl.
USPC .......................................................... 707/749

(58) Field of Classification Search
USPC ................................................. 707/748, 749
See application file for complete search history.

(56) References Cited

U.S. PATENT DOCUMENTS

| | | | |
|---|---|---|---|
| 7,966,305 B2 | 6/2011 | Olsen | |
| 2005/0108227 A1* | 5/2005 | Russell-Falla et al. | 707/5 |
| 2008/0065620 A1* | 3/2008 | Chopra | 707/5 |
| 2009/0094697 A1* | 4/2009 | Provos et al. | 726/23 |
| 2009/0307003 A1 | 12/2009 | Benyamin et al. | |
| 2011/0258148 A1* | 10/2011 | Gao et al. | 706/12 |
| 2011/0289063 A1* | 11/2011 | Radlinski et al. | 707/706 |

\* cited by examiner

*Primary Examiner* — Fred I Ehichioya
*Assistant Examiner* — Kris Mackes
(74) *Attorney, Agent, or Firm* — Sterne, Kessler, Goldstein & Fox P.L.L.C.

(57) ABSTRACT

Methods, systems, and apparatus, including computer programs encoded on a computer storage medium, for web page identification by propagating scores in a graph. In one aspect, a method identifies two or more web pages, wherein each web page is associated with one or more features, and each web page is associated with a respective first score, and each feature is associated with a respective second score. A graph is generated linking the two or more web pages and the one or more features. An updated first score is calculated for each web page and an updated second score is calculated for each feature. For each web page, a determination is made as to whether the respective updated first score meets a threshold. The web page associated with the updated first score that meets the threshold is identified as a web page that an advertiser can use as a landing page.

21 Claims, 5 Drawing Sheets

LABELING OBJECTS BY PROPAGATING SCORES IN A GRAPH

BACKGROUND

The Internet provides access to a wide range of resources. For example, web pages for particular subjects are accessible over the Internet. Access to these resources presents opportunities for advertisements to be provided with the resources. A web page can, for example, include advertisement slots in which advertisements can be presented. These advertisements slots can be defined for presentation with a web page, for example, in a pop-up window. The advertisements slots can also be defined in the web page.

An advertiser creates an advertisement campaign describing the advertisement and includes a link to a landing page describing the advertisement. When the advertisement is selected by the user, the user is directed to the landing page. The landing pages can include any type of content, whether it is content related to the advertisement or content unrelated to the advertisement. For example, the landing page may include pornographic material that is unsuitable to be used as a landing page. The landing pages can also include malicious spyware or other types of content that may cause harm to a user's computer.

BRIEF SUMMARY

The embodiments described below include systems and methods labeling objects by propagating scores in a graph. According to an embodiment, a method may include identifying two or more web pages, wherein each web page is associated with one or more features, and each web page is associated with a respective first score indicating whether the web page is a bad web page, and each feature is associated with a respective second score, and wherein at least one of the features is a common feature among the two or more web pages. The method further includes generating a graph linking the two or more web pages and the one or more features associated with each web page; calculating an updated first score for each web page as a function of the first score of the respective web page and each of the second scores of the features associated with the respective web page; calculating an updated second score for each feature as the function of the second score of the respective feature and each of the first scores of the web pages linked to the respective feature; for each web page, determining whether the respective updated first score meets a threshold; and identifying the web page associated with the updated first score that meets the threshold as a web page that an advertiser associated with the respective web page can use as a landing page for an advertisement.

According to another embodiment, a system may include a first identification module configured to identify two or more web pages, wherein each web page is associated with one or more features, and each web page is associated with a respective first score indicating whether the web page is a bad web page, and each feature is associated with a respective second score, wherein at least one of the features is a common feature among the two or more web pages; a graph generation module, implemented on a computing device, configured to generate a graph linking the two or more web pages and the one or more features associated with each web page; a web page calculation module configured to calculate an updated first score for each web page as a function of the first score of the respective web page and each of the second scores of the features associated with the respective web page; a feature calculation module configured to calculate an updated second score for each feature as the function of the second score of the respective feature and each of the first scores of the web pages linked to the respective feature; a determination module configured to determine, for each web page, whether the respective updated first score meets a threshold; and a second identification module configured to identify the web page associated with the updated first score that meets the threshold as a web page that an advertiser associated with the respective web page can use as a landing page for an advertisement.

According to another embodiment, a computer storage medium encoded with a computer program is provided. The program comprising instructions that when executed by one or more processors cause the one or more processors to perform operations comprising identifying two or more web pages, wherein each web page is associated with one or more features, and each web page is associated with a respective first score indicating whether the web page is a bad web page, and each feature is associated with a respective second score, wherein at least one of the features is a common feature among the two or more web pages; generating a graph linking the two or more web pages and the one or more features associated with each web page; calculating an updated first score for each web page as a function of the first score of the respective web page and each of the second scores of the features associated with the respective web page; calculating an updated second score for each feature as the function of the second score of the respective feature and each of the first scores of the web pages linked to the respective feature; for each web page, determining whether the respective updated first score meets a threshold; and identifying the web page associated with the updated first score that meets the threshold as a web page that an advertiser associated with the respective web page can use as a landing page for an advertisement.

These and other implementations can each optionally include one or more of the following features. A determination can be made that each of the updated first scores and the updated second scores have stabilized. The first score can indicate whether the respective web page is a bad web page. The calculating can comprise propagating using a random walk. The graph can be a bipartite graph. The features can include at least one of a domain, a customer ID, and a number of words on the web page. The average can be a function. The method can include notifying an advertiser associated with the web page associated with the updated first score that exceeds the threshold.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Advertisers can create campaigns for advertisements, and in the campaigns indicate a web page to be used as a landing page when the advertisement is displayed. Some of these web pages are known to be bad web pages. A bad web page is one that is known to include inappropriate content or one that contains spyware and other malicious content. Not all web pages, however, are known to be good or bad.

Each of these known web pages can be associated with a score that indicates whether it is a known bad web page. Each web page can also be associated with one or more features, such as for example, the number of words on the web page or a domain associated with the web page. A graph can be generated from all identified web pages. Each of the web pages in the graph can be linked by the one or more common feature the respective web page has in common with another web page. Each web page and feature becomes a node in the graph. Each node is given an initial score. If the web page is known to be bad, the initial score reflects the webpage as a bad web page.

A random walk begins, and the initial score of each web page is propagated down to each of the one or more features associated with the web page. The features are given a score based on the score of the web pages that are associated with that feature, as well as based on the initial score of the feature. The score of each feature is then propagated to each respective web page. The web page receives an updated score based on the score of each feature associated with the web page and also the initial score of the web page. The cycle continues until the scores of each of the web pages and each of the features have stabilized. Once the scores stabilize, the scores of each web page is analyzed to determine whether the score meets a threshold. If the score falls above the threshold, the web page cannot be used as a landing page by an advertiser. If the score falls below the threshold, the landing page can be used as a landing page.

Figure 1:
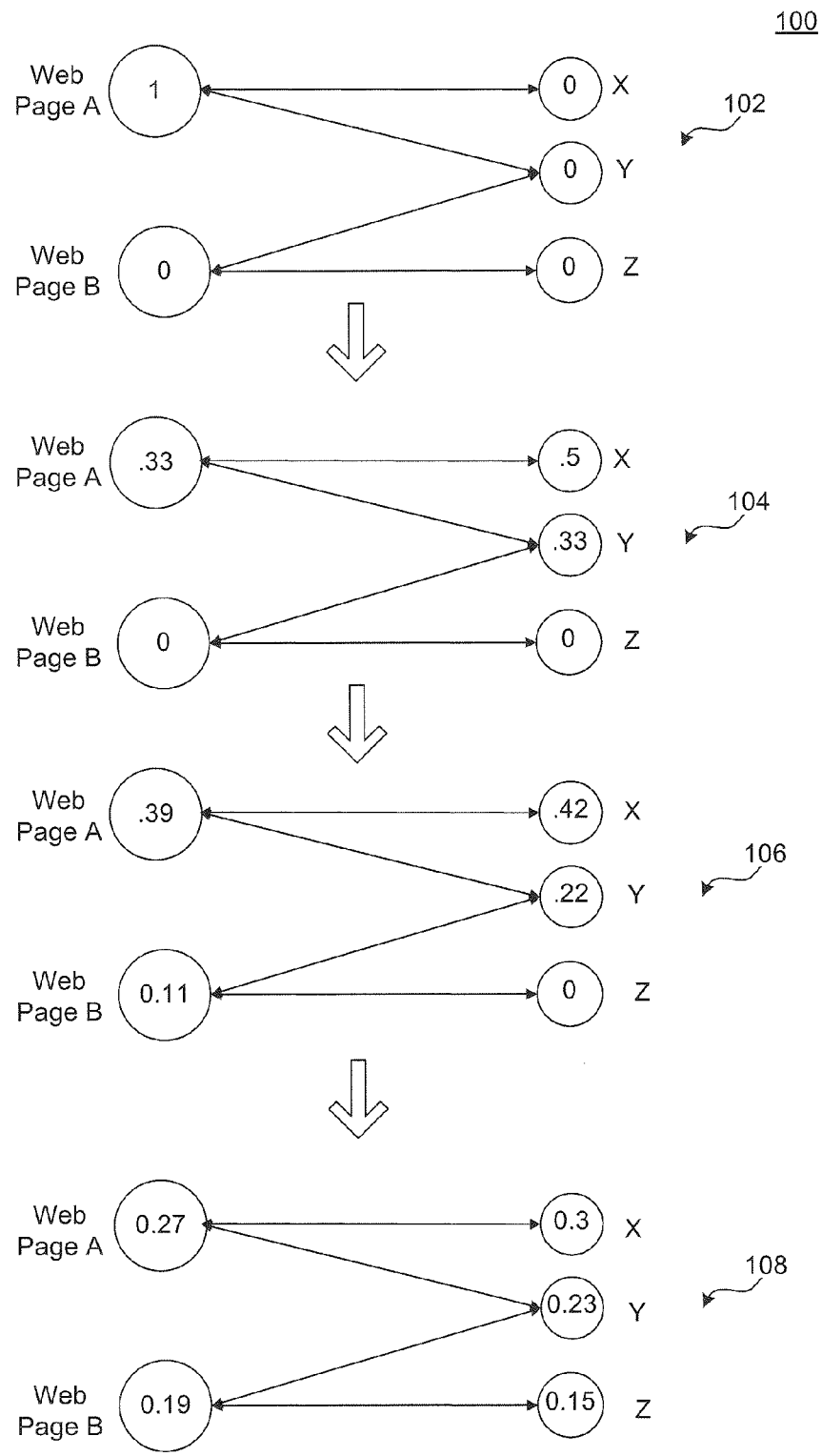
FIG. 1 is a graph propagation example.

FIG. 1 is an example 100 of graph propagation being used to label web pages.

An initial graph 102 is constructed of two or more web pages, web page A and web page B. Each web page is a node in the graph 102. Web page A is associated with two features, features X and Y. Web page B is associated with two features, features Y and Z. Both web page A and web page B share the same feature Y. For example, feature Y may be a domain that both web pages share in common or a customer ID of an advertiser that both web pages share in common. Each of the features X, Y, and Z are also constructed into the graph 102. An edge connects a web page to its feature. A feature includes two edges if the feature is shared by the same web page. For example, because feature Y is shared by both web page A and web page B, feature Y includes an edge from web page A and from web page B.

Web page A is a known bad web page. For example, web page A may include pornographic material or may include spyware on the web page. Web page A may have been previously crawled and a determination was made that it was a known bad web page. An initial score of "1" is given to web page A because it is a known bad web page. Web page B is not a known bad web page and therefore is given a score of 0. For example, web page B may have been crawled previously and nothing on the web page deemed the web page to be a bad web page.

The features X, Y, and Z are also given an initial score of 0 in the graph 102. In some implementations, if a certain feature is known to be bad, the feature can be given an initial score of 1. The graph 102 is constructed so that all features have an edge between them if they are associated with the same web page.

Once the graph 102 has been constructed, a random walk begins, with scores being propagated from node to node alone the edges of the graph. Web pages A and B propagate their scores down to their respective features. Each feature is given a score based on the scores of the web pages that are linked to the feature as well as the initial respective feature score. The scores of the features X, Y, and Z are updated based on the scores of the web pages associated with each feature and the initial respective feature score. The score of each feature can be a function of the scores of the web pages connected to that feature in the graph and the initial respective feature score.

For example, feature X can receive a score as a function of the score 1 from web page A and score 0 from the initial feature score of feature X. For example, the new score of feature X can be calculated to be 0.5, as shown in graph 104. Feature Y receives a score as a function of the score of 1 from web page A, the score of 0 from web page B, and its initial feature score of 0.33. Feature Z receives a score as a function of the score 0 of web page B and the initial feature score of Z, which is 0. Web page A can then receive an updated score as a function of the score of feature X, 0.5, the score of feature Y, 0.33, and the initial score of web page A, which is 1. Therefore, the updated web page score of web page A can be calculated to be 0.33. Web page B can then receive a score as a function of the score of feature Y, 0.0, the score of feature Z, 0, and the initial score of web page B, which is 0. Therefore, the updated web page score of web page B can be 0. Graph 104 reflects the updated scores after one iteration.

The propagation continues as shown in graph 106, until the scores have stabilized in graph 108. The stabilization indicates that the scores do not change significantly. For example, the iterations can discontinue once the change in score is less than a predetermined amount, for example, less than 0.05.

At this point, an advertisement system can compare the score of each web page to a threshold to determine whether the score of the web page falls below or above the threshold. In one implementation, if its above the threshold then the web page cannot be used by an advertiser as a landing page associated with an advertisement. If, however, the score is below the threshold, then the web page can be used as a landing page.

Figure 2:
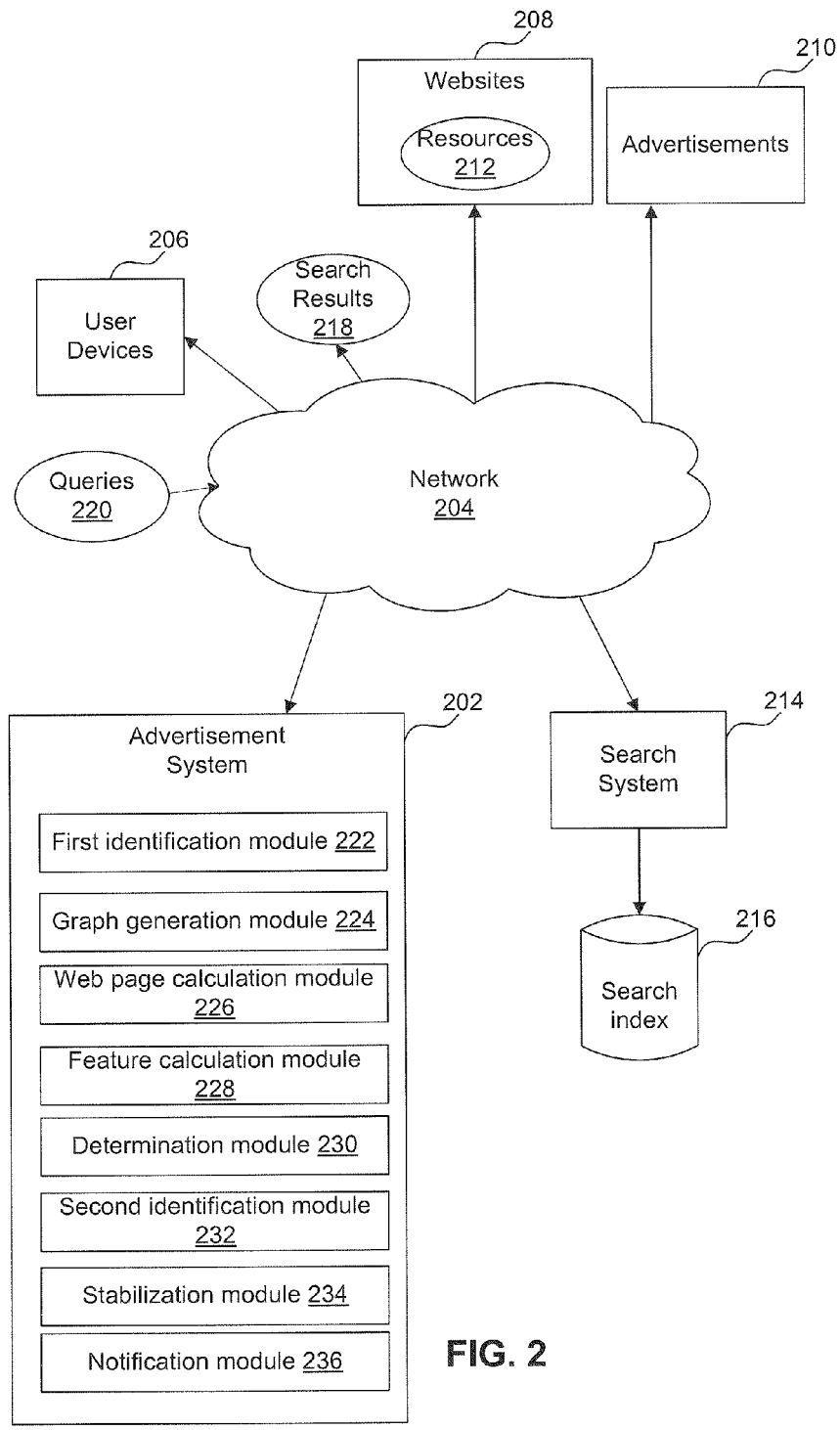
FIG. 2 is a block diagram of an example environment in which an advertisement system manages advertising services.

FIG. 2 is a block diagram of an example environment 200 in which an advertisement system 202 manages advertising services. The example environment 200 includes one or more networks 204, such as a local area network (LAN), a wide area network (WAN), the Internet, or a combination thereof. The network 204 connects user devices 206, websites 208, advertisers 210, and the advertisement system 202. The environment 200 may include many thousands of user devices 206, websites 208, and advertisers 210.

A website 208 is one or more resources 212 associated with a domain name and hosted by one or more servers. An example website is a collection of web pages formatted in hypertext markup language (HTML) that can contain text, images, multimedia content, and programming elements, such as scripts. Each website 208 is maintained by a publisher, which is an entity that controls, manages and/or owns the website 204.

A resource 212 is any data that can be provided over the network 204. A resource 212 is identified by a resource address that is associated with the resource 212. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 206 is an electronic device that is under control of a user and is capable of requesting and receiving resources over the network 204. Example user devices 206 include personal computers, mobile communication devices, and other devices that can send and receive data over the network 204. A user device 206 typically includes a user application, such as a web browser, to facilitate the sending and receiving of data over the network 204.

A user device 206 can request resources 212 from a website 208. In turn, data representing the resource 212 can be provided to the user device 206 for presentation by the user device 206. The data representing the resource 212 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 214 that identifies the resources by crawling and indexing the resources provided by the publishers on the websites 208. Data about the resources can be indexed based on the resource to which the data corresponds. The indexed and, optionally, cached copies of the resources are stored in an indexed cache 216.

User devices 206 can submit search queries 220 to the search system 214 over the network 204. In response, the search system 214 accesses the indexed cache 216 to identify resources that are relevant to the search query 220. The search system 214 identifies the resources in the form of search results 218 and returns the search results 218 to the user devices 206 in search results pages. A search result 218 is data generated by the search system 214 that identifies a resource that is responsive to a particular search query, and includes a link to the resource. An example search result 218 can include a web page title, a snippet of text or a portion of an image extracted from the web page, and the URL of the web page. Search results pages can also include one or more advertisement slots in which advertisements can be presented.

When a resource 212 or search results 218 are requested by a user device 206, the advertisement system 202 receives a request for advertisements to be provided with the resource 212 or search results 218. The request for advertisements can include characteristics of the advertisement slots that are defined for the requested resource or search results page, and can be provided to the advertisement system 202.

For example, a reference (e.g., URL) to the resource for which the advertisement slot is defined, a size of the advertisement slot, and/or media types that are available for presentation in the advertisement slot can be provided to the advertisement system 202. Similarly, keywords associated with a requested resource ("resource keywords") or a search query 220 for which search results are requested can also be provided to the advertisement system 202 to facilitate identification of advertisements that are relevant to the resource or search query 220.

Based on data included in the request for advertisements, the advertisement system 202 can select advertisements that are eligible to be provided in response to the request ("eligible advertisements"). For example, eligible advertisements can include advertisements having characteristics matching the characteristics of advertisement slots and that are identified as relevant to specified resource keywords or search queries 220.

The advertisement system 202 can select the eligible advertisements that are provided for presentation in advertisement slots of a resource or search results page based on results of an auction. For example, the advertisement system 202 can receive bids from advertisers and allocate the advertisement slots to the highest bidders at the conclusion of the auction. The bids are amounts that the advertisers are willing to pay for presentation (or selection) of their advertisement with a resource or search results page. Advertisers can also specify budgets for their advertisement campaigns. A budget is a specified amount that an advertiser is willing to pay for distribution of content over a specified budget period.

Each advertisement provided by an advertiser 210 can be associated with a landing page. A landing page is a website 208 that describes the advertisement. The advertisement system 202 can facilitate the classification of landing pages based on features the landing page may share in common. The advertisement system 202 can include a first identification module 222, a graph generation module 224, a web page calculation module 226, a feature calculation module 228, a determination module 230, a second identification module 232, a stabilization module 234, and a notification module 236 that can be used together or separately to determine whether a web page can be used as a landing page.

An example process of determining whether web pages can be used as landing pages is described with reference to FIG. 3. A swim lane diagram is described with reference to FIG. 4. A system that can be used to implement these examples is then described with reference to FIG. 5.

Figure 3:
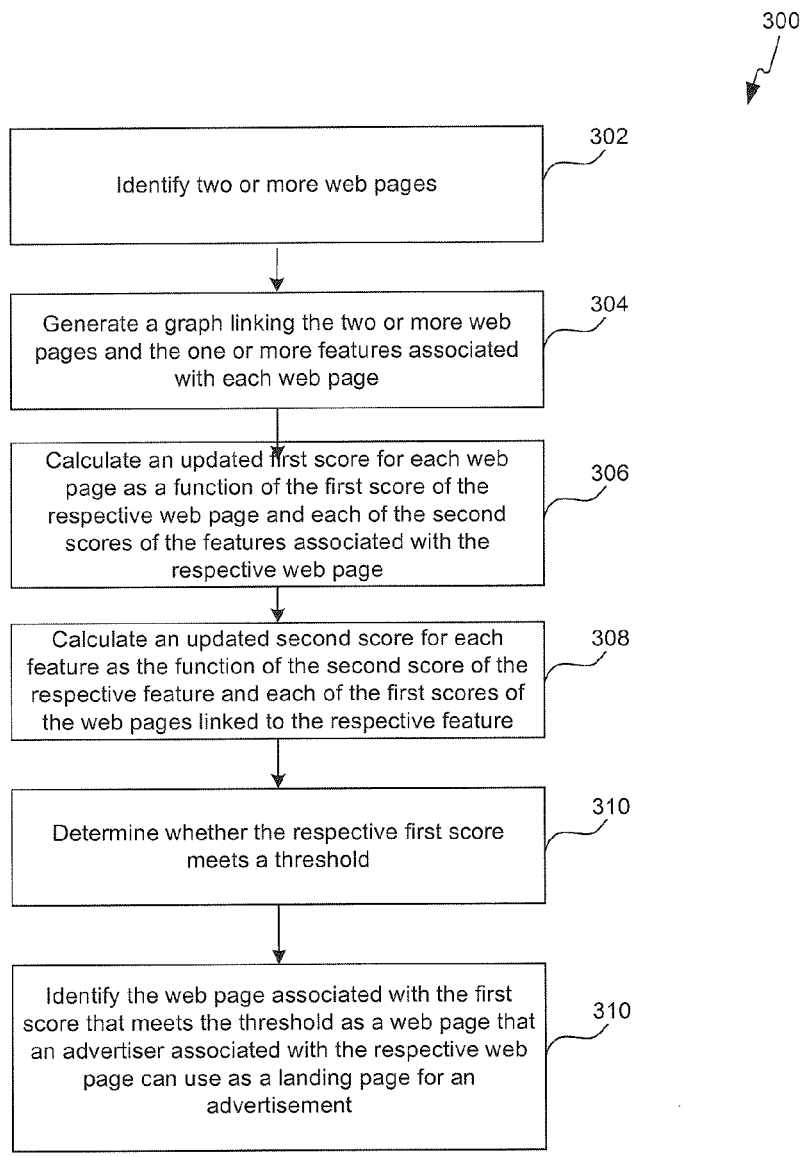
FIG. 3 is a flowchart illustrating a method for labeling web pages, according to an embodiment.

FIG. 3 illustrates an exemplary method 300 for web page scoring using propagation of scores, according to an embodiment. In step 302, two or more web pages are identified. Each web page is associated with one or more features. A feature can include, for example, a customer ID associated with the web page, a domain associated with the web page, or a number of words on the web page.

In some cases, each web page is associated with a respective first score indicating whether the web page is a bad web page. A bad web page can include a web page that includes inappropriate material such as pornography, or spam, or one that includes malicious spyware, or other undesirable features.

In some cases a 1 indicates whether the webpage is a bad web page. In other cases, any number can be used to indicate whether a web page is bad, for example, 2, 3, 9, and so on. In some cases, the number 0 can be used to indicate whether a webpage is not bad. In other cases, any number can be used to indicate that the web page is not bad, for example, 2, 4, 7, and so on.

In some cases, each webpage can be associated with a number indicating a characteristic other than the web page being a bad webpage. The number can indicate that it belongs to a certain category or to a certain class of web pages. For example, if the webpage is related to shopping it can be associated with 0, or with 3. In another example, the web page can be associated with a number, for example, 3, if it relates to cars.

Each feature may be associated with a respective second score. The second score associated with each feature may indicate an initial score being the same for each feature. At least one of the features may be a common feature among the two or more web pages. For example, two web pages may share a common domain or may include the same number of words on each web page. In some cases, the features can also be associated with a second score indicating the feature is a bad feature. For example, a certain domain can be associated with spyware and if a web page is associated with that feature, the feature can be given an initial second score indicating it is a bad feature.

In step 304, a graph linking the two or more web pages and the one or more features associated with each web page is generated. In some cases, the graph can be a bipartite graph. Other types of graphs can be generated. For example, a graph in which all features have an edge between them if they are associated with the same web page, and an edge to each web page that they are associated with. Other graphs can include a graph in which there are edges between web pages only, but weighted by the number of features they have in common.

In step 306, an updated first score for each web page is calculated as a function of the first score of the respective web page and each of the second scores of the features associated with the respective web page. In some cases, the function can be an average of the first score of the respective web page and each of the second scores of the features associated with the respective web page. Other functions can be used.

In some cases, calculating the first score includes performing a random walk with scores being propagated from node to node along the edges of the graph. Each node is assigned a score that is a function of its current value and the values of its neighbors.

In step 308, an updated second score for each feature is calculated as a function of the second score of the respective feature and each of the first scores of the web pages linked to the respective feature.

In some cases, the calculation of the first updated score and the second updated score are performed as a single calculation step.

In some cases, the process of updating the first score and the second score continues until the first scores and the second scores have stabilized. Therefore, even if the scores are updated, the scores do not changed beyond a certain threshold. For example, the scores may only change by 0.01. Therefore, at this point, the updated first scores and the updated second scores are considered stabilized. In some cases, the first score and the second score are the same score.

In step 310, a determination is made for each web page as to whether the respective updated first score meets a threshold. For example, a threshold can be determined and a web page with a updated first score above that threshold can be labeled as a bad web page.

The web page associated with the updated first score that falls below the threshold is identified as a web page that an advertiser associated with the respective web page can use as a landing page for an advertisement 312.

In some cases, the advertiser associated with the web page associated with the updated first score that exceeds the threshold is notified that the web page cannot be used as a landing page.

According to an embodiment, steps 302, 304, 306, 208, 310, and 312 may be performed by a first identification module 222, a graph generation module 224, a web page calculation module 226, a feature calculation module 228, a determination module 230, and a second identification module 232, respectively. The determination that each of the updated first scores and the updated second scores have been stabilized can be performed by the stabilization module 234, and the advertiser notification can be performed by the notification module 236. In other embodiments, steps 302, 304, 306, 208, 310, and 312 may be performed by a single module, for example, the first identification module 222.

Figure 4:
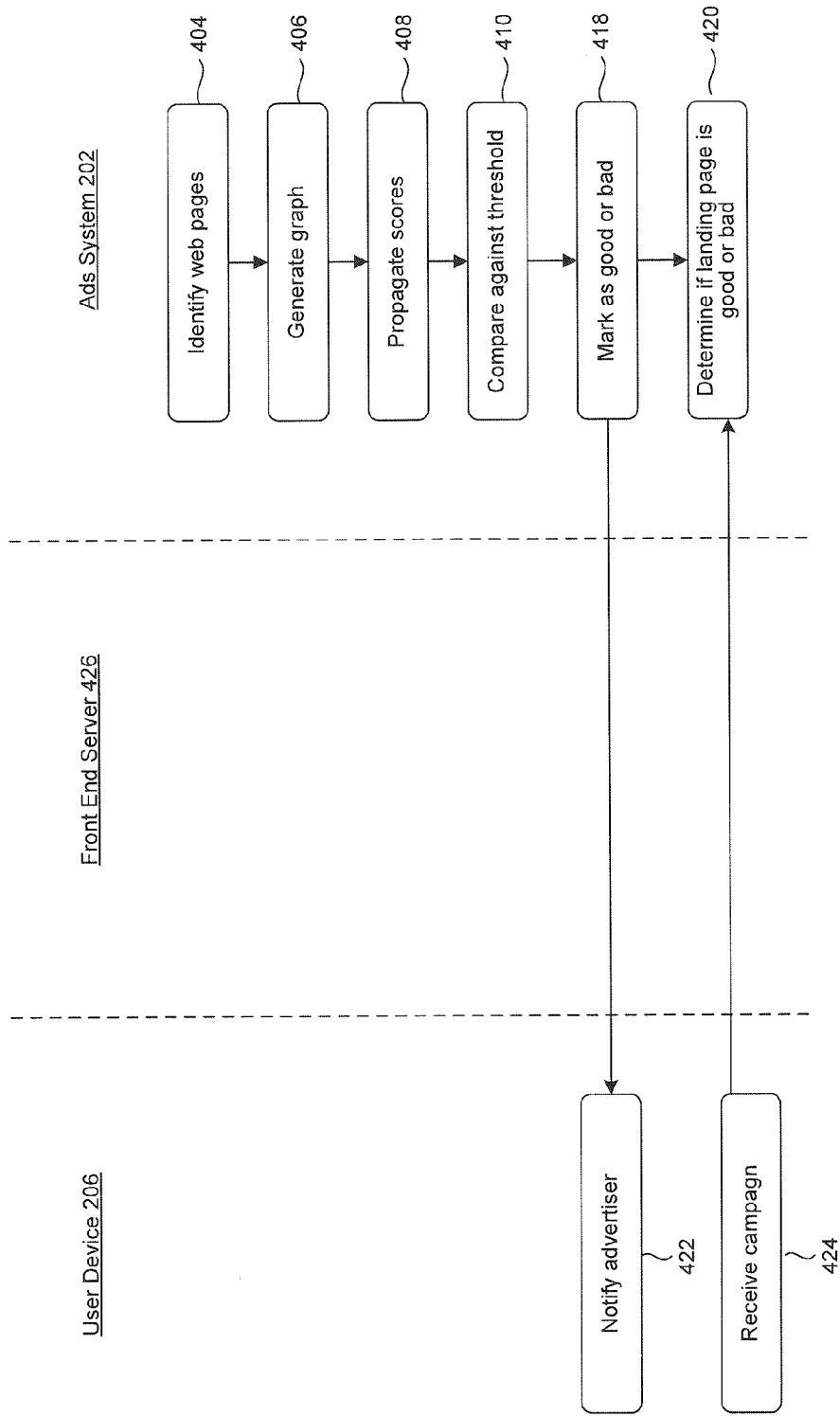
FIG. 4 is a swim lane diagram illustrating a process for utilizing a local application cache in connection with a remote server system, according to an embodiment.

FIG. 4 is a swim lane diagram illustrating a process for propagating scores in a graph to determine if a landing page should be used as a landing page. In this illustration, a remote server system (e.g., an advertisement system 202) identifies web pages 404 and generates a graph 406 using the web pages and features associated with the web pages. The server system scores each node in the graph based on a function of the score of each node and the score of each of the node's neighbor nodes. Once the scores have stabilized, the remote server system compares the scores of each of the web pages to a threshold. If the scores of the web pages falls above the threshold, the remote server system marks the web page associated with the score as a bad web page. The remote server system then notifies the advertiser 422 associated with the bad web page. The remote server system classifies the other web pages as good. When a campaign is received 424 from a user device 206 through a front end server 426, the landing page associated with the campaign is compared to the classified web pages and if the landing page is associated with a score that indicates it is a good web page, the advertiser is permitted to use the landing page in the advertisement creative.

Aspects of the present invention shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
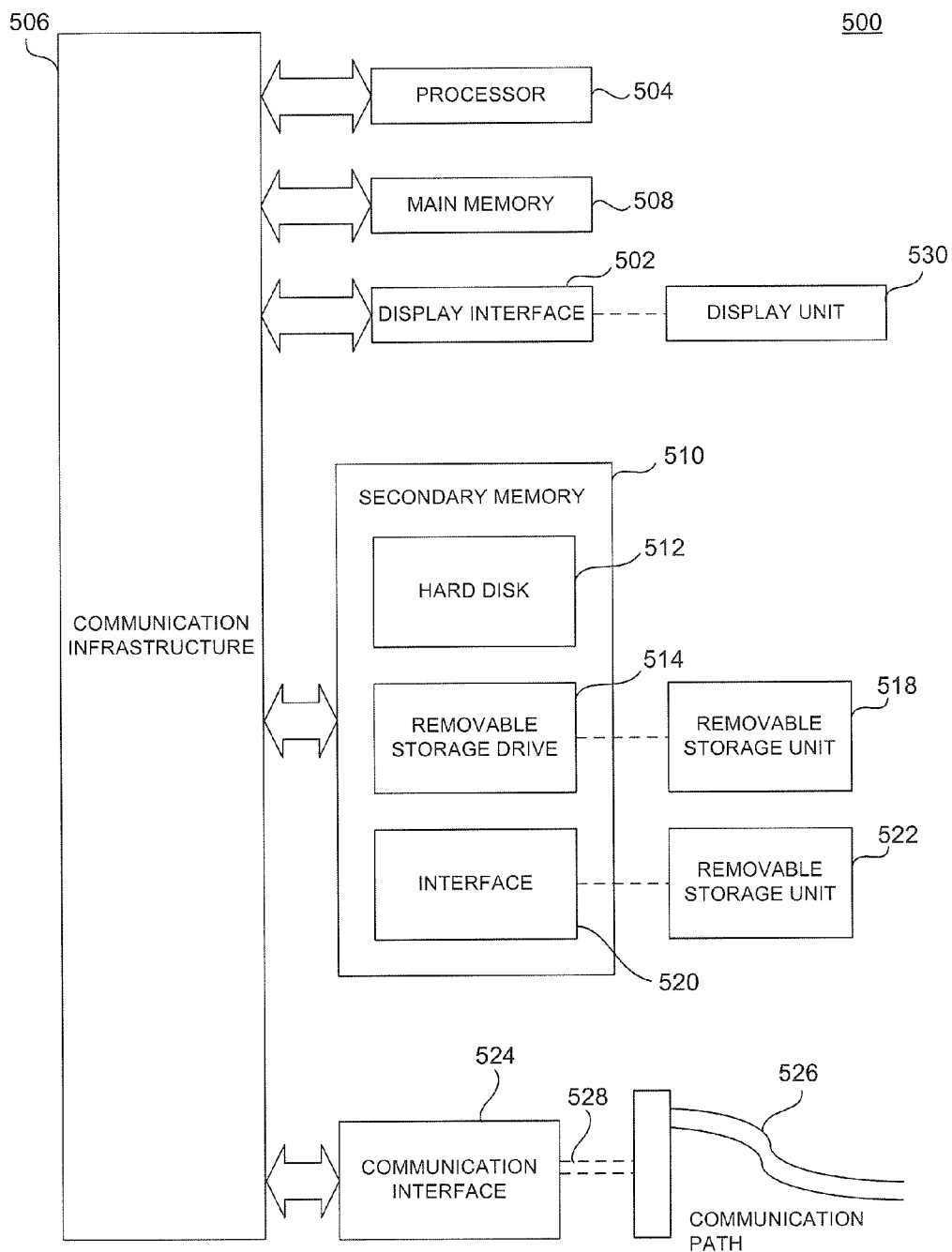
FIG. 5 is a system diagram that can be used to implement embodiments described herein.

FIG. 5 illustrates an example computer system 500 in which embodiments of the present invention, or portions thereof, may by implemented as computer-readable code. For example, advertisement system 202, may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by flowchart 300 of FIG. 3 discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   identifying two or more web pages, wherein each web page is associated with one or more features and with a respective score indicating whether the web page contains inappropriate or malicious content, and each feature from the one or more features is associated with a respective score indicating whether the feature is associated with inappropriate or malicious content, wherein at least one feature from the one or more features is a common feature between two or more of the identified web pages;

generating a graph linking each of the identified web pages with the one or more features associated with each web page;
performing a random walk on the graph, wherein:
(i) the respective score of each web page reached in the random walk is updated based on a function of the current score of the web page and the respective score of the features linked to the web page in the graph, wherein the respective scores of the features linked to the web page are propagated to the web page along edges of the graph, and
(ii) the respective score of each feature reached in the random walk is updated based on a function of the current score of the feature and the respective scores of the one or more web pages linked to the feature in the graph, wherein the respective scores of the one or more web pages linked to the feature are propagated to the feature along edges of the graph;
for each web page, determining whether the respective updated score meets a threshold; and
identifying the web page associated with the updated score that meets the threshold as a web page that an advertiser associated with the respective web page can use as a landing page for an advertisement.

2. The method of claim 1, further comprising:
determining that each of the updated web page scores and the updated feature scores have stabilized.

3. The method of claim 1, wherein each web page score indicates whether the respective web page can be used as a landing page for an advertisement.

4. The method of claim 1, wherein the graph is a bipartite graph.

5. The method of claim 1, wherein the features include at least one of a domain, a customer ID, and a number of words on the web page.

6. The method of claim 1, wherein the functions are average functions.

7. The method of claim 1, further comprising:
notifying an advertiser associated with the web page associated with the updated score that exceeds the threshold.

8. The method of claim 1, wherein generating a graph linking each of the identified web pages with the one or more features associated with each web page further comprises giving the respective score of each web page and the respective score of each feature a respective initial score.

9. A system, comprising:
a memory; and
at least one processor coupled to the memory and configured to:
identify two or more web pages, wherein each web page is associated with one or more features and with a respective score indicating whether the web page-contains inappropriate or malicious content, and each feature from the one or more features is associated with a respective score indicating whether the feature is associated with inappropriate or malicious content, wherein at least one feature from the one or more features is a common feature between two or more of the identified web pages;
generate a graph linking each of the identified web pages with the one or more features associated with each web page;
perform a random walk on the graph, wherein:
(i) the respective score of each web page reached in the random walk is updated based on a function of the current score of the web page and the respective scores of the features linked to the web page in the graph, wherein the respective scores of the features linked to the web page are propagated to the web page along edges of the graph, and
(ii) the respective score of each feature reached in the random walk is updated based on a function of the current score of the feature and the respective scores of the one of more web pages linked to the feature in the graph, wherein the respective scores of the one or more web pages linked to the feature are propagated to the feature along edges of the graph;
determine, for each web page, whether the respective updated score meets a threshold; and
identify the web page associated with the updated score that meets the threshold as a web page that an advertiser associated with the respective web page can use as a landing page for an advertisement.

10. The system of claim 9, the at least one processor further configured to determine that each of the updated web page scores and the updated feature scores have stabilized.

11. The system of claim 9, wherein each web page score indicates whether the respective web page can be used as a landing page for an advertisement.

12. The system of claim 9, wherein the graph is a bipartite graph.

13. The system of claim 9, wherein the features include at least one of a domain, a customer ID, and a number of words on the web page.

14. The system of claim 9, wherein the functions are average functions.

15. The system of claim 9, the at least one processor further configured to notify an advertiser associated with the web page associated with the updated score that exceeds the threshold.

16. The system of claim 9, wherein the graph generation module is further configured to give the respective score of each web page and the respective score of each feature a respective initial score.

17. A non-transitory computer usable medium encoded with a computer program, the program comprising instructions that when executed by one or more processors cause the one or more processors to perform operations comprising:
identifying two or more web pages, wherein each web page is associated with one or more features and with a respective score indicating whether the web page contains inappropriate or malicious content, and each feature from the one or more features is associated with a respective score indicating whether the respective feature is associated with inappropriate of malicious content, wherein at least one feature from the one or more features is a common feature between two or more of the identified web pages;
generating a graph linking each of the identified web pages with the one or more features associated with each web page;
performing a random walk on the graph, wherein:
(i) the respective score of each web page reached in the random walk is updated based on a function of the current score of the web page and the respective scores of the features linked to the web page in the graph, wherein the respective scores of the features linked to the web page are propagated to the web page along edges of the graph, and
(ii) the respective score of each feature reached in the random walk is updated based on a function of the current score of the feature and the respective scores of the one or more web pages linked to the feature in the graph, wherein the respective scores of the one or more web pages linked to the feature are propagated to the feature along edges of the graph;

for each web page, determining whether the respective updated score meets a threshold; and identifying the web page associated with the updated score that meets the threshold as a web page that an advertiser associated with the respective web page can use as a landing page for an advertisement.

18. The non-transitory computer usable medium of claim 17, wherein the operations further comprise:

determining that each of the updated web page scores and the updated feature scores have stabilized.

19. The non-transitory computer usable medium of claim 17, wherein the updated score indicates whether the respective web page can be used as a landing page for an advertisement.

20. The non-transitory computer usable medium of claim 17, wherein the graph is a bipartite graph.

21. The non-transitory computer usable medium of claim 17, wherein generating a graph linking each of the identified web pages with the one or more features associated with each web page further comprises giving the respective score of each web page and the respective score of each feature a respective initial score.

* * * * *